A. H. REIMANN.
DRILL TESTING GAGE.
APPLICATION FILED DEC. 21, 1909.
990,668.
Patented Apr. 25, 1911.
2 SHEETS—SHEET 2.
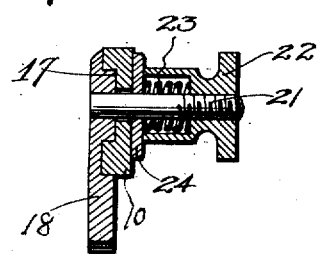
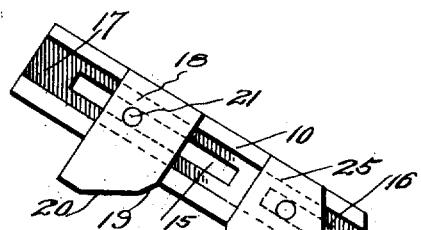
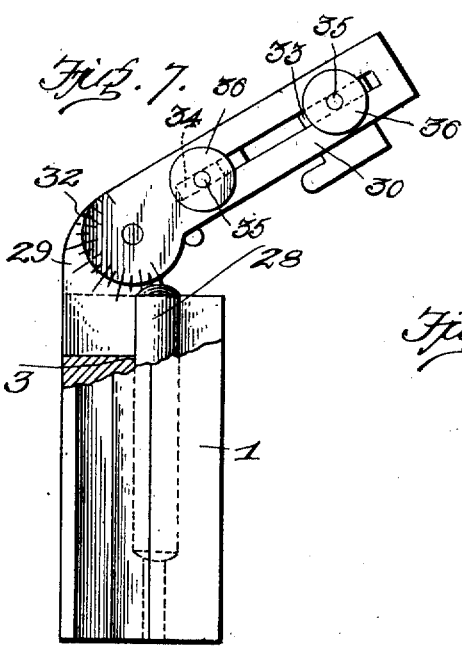
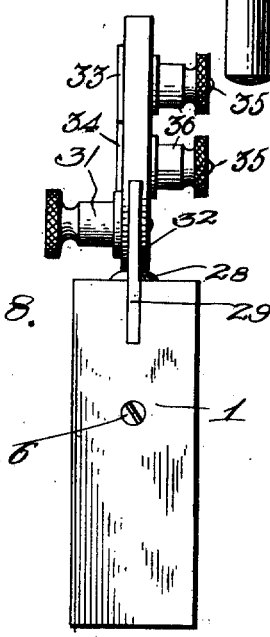
Witnesses
Inventor
A. H. Reimann
by H. B. Willson & Co.
Attorneys

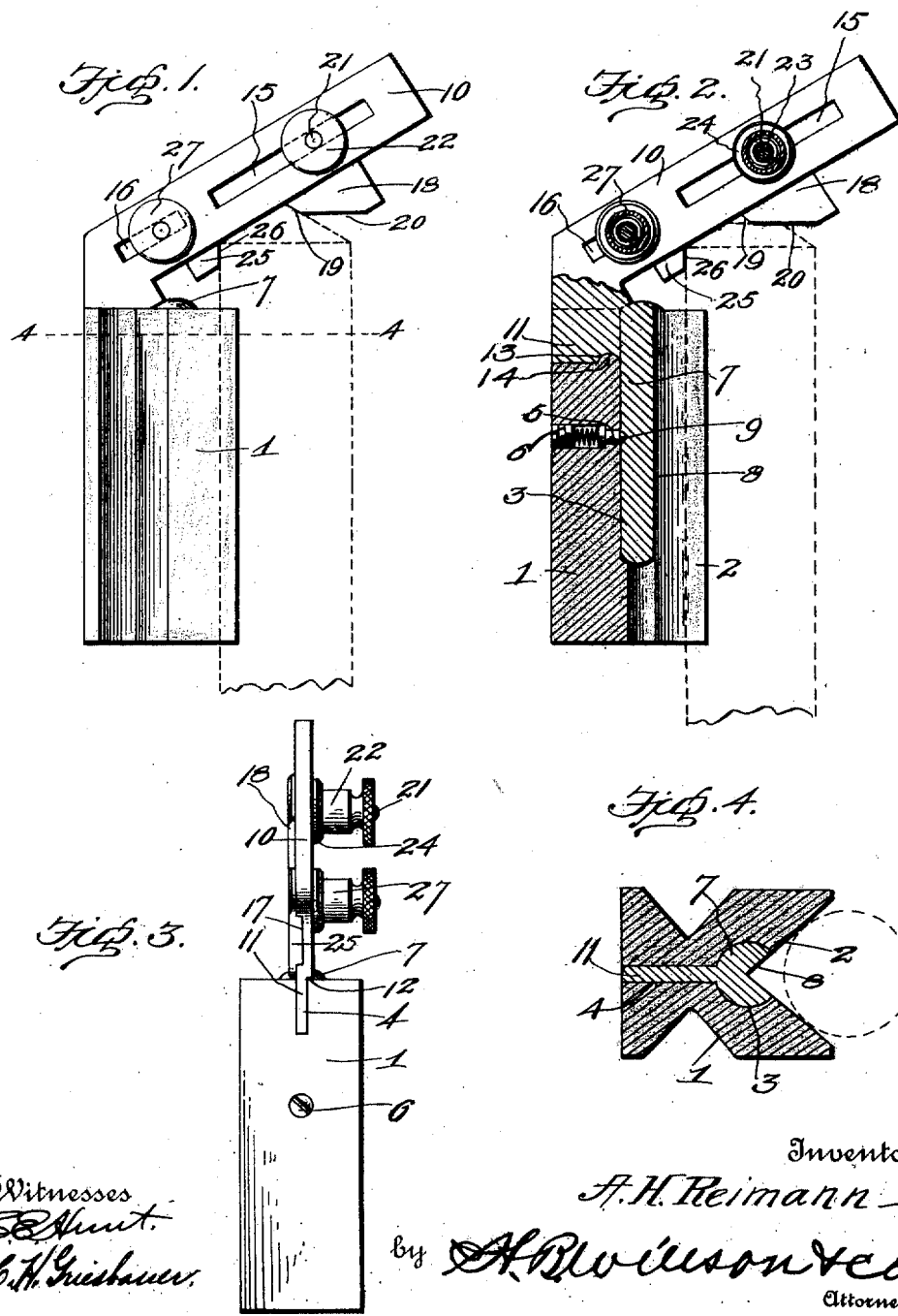

UNITED STATES PATENT OFFICE.

ADOLPH H. REIMANN, OF DETROIT, MICHIGAN.

DRILL-TESTING GAGE.

990,668.  Specification of Letters Patent.  Patented Apr. 25, 1911.

Application filed December 21, 1909. Serial No. 534,249.

*To all whom it may concern:*

Be it known that I, ADOLPH H. REIMANN, a citizen of the United States, residing at Detroit, in the county of Wayne and State of Michigan, have invented certain new and useful Improvements in Drill-Testing Gages; and I do declare the following to be a full, clear, and exact description of the invention, such as will enable others skilled in the art to which it appertains to make and use the same.

This invention relates to improvements in V block gages for testing drills.

One object of the invention is to provide a gage of this character by means of which the lips of the drills may be accurately tested.

Another object is to provide a gage of this character which will be simple in construction, efficient and reliable in operation and well adapted to the purpose for which it is designed.

With the foregoing and other objects in view, the invention consists of certain novel features of construction, combination and arrangement of parts, as will be more fully described and particularly pointed out in the appended claims.

In the accompanying drawings, Figure 1 is a side view of my improved gage showing a standard testing blade arranged thereon and illustrating the parts in position for testing a two lip drill, the latter being shown in dotted lines; Fig. 2 is a vertical section of the same, showing the parts arranged for testing a three lip or other form of drill having a flat end or an uneven number of lips, the latter being shown in dotted lines; Fig. 3 is a rear view of the gage; Fig. 4 is a horizontal section on the line 4—4 of Fig. 1; Fig. 5 is an enlarged detail cross sectional view of the testing blade taken through one of the adjustable gage members and its retaining screw. Fig. 6 is a rear side view of the gage removed from the block. Fig. 7 is a similar view of a modified form of gage showing a universal test blade. Fig. 8 is a rear view of the gage shown in Fig. 7.

Referring more particularly to the drawings, 1 denotes an ordinary V block in one side of which is formed the usual V-shaped drill seat 2. The block 1 has formed therethrough a longitudinally disposed passage, the upper portion of which is enlarged to form a socket 3, one side of which is intersected by the apex of the V-shaped seat 2, formed in the side of the block. In the opposite side of the block from the seat 2 and adjacent to its upper end is formed a centrally disposed slot or recess 4; in the side of the block opposite to the seat 2, and below the slot 4, is formed a hole in which is arranged a spring projected retaining pin 5. The pin 5 is held in position by a screw 6, and the inner end of the pin is tapered or conical shaped and projects into the socket 3, for a purpose hereinafter described.

With the socket 3 in the V block is adapted to be engaged the different forms of my gage. The form of gage shown in the first figures of the drawings comprises a shank or stem 7, of cylindrical shape and having a diameter corresponding to the diameter of the socket 3 with which the shank is engaged. In one side of the shank is formed a V-shaped groove 8, which forms a continuation of the seat 2 in the block. In the opposite side of the stem or shank is formed a notch 9, which is engaged by the conical end of the retaining pins 5 in the block thereby holding the gage in position in the socket. Rigidly secured to the upper end of the shank 7, is a standard angle gaging blade 10, disposed at an angle of 59° to the seat in the block. The blade 10 is secured to the upper end of the shank by a plate 11, which is offset from the end of the blade and forms a shoulder 12 Fig. 3. When the blade is in place in the block, the plate 11 fits into the slot 4 in the end of the block and the shoulder 12 engages the outer end of the block as shown. In the lower edge of the plate 11, adjacent to the shank 7, is formed a notch 13, which is adapted to engage a projection 14, formed on the lower wall of the slot 4 in the block as clearly shown in Fig. 2 of the drawings.

In the blade 10, is formed a long slot 15, and a short slot 16, and in the rear side of the blade is formed a longitudinally disposed groove or channel 17 Fig. 5. Slidably mounted on the rear side of the blade 10, in the upper slot 15 therein is a length gage block or member 18, having on its lower end a 59° gaging surface 19, and a 90° gaging surface 20. The lip engaging block 18 is recessed on one side to slidably engage the groove or channel portion of the adjacent side of the blade 10. The block 18, is provided with a laterally projecting pin or bolt 21, which extends through the slot 15, and is threaded on its outer end to receive a retaining nut 22. The nut 22 has a hollow body portion, in which is arranged a coiled spring 23, one end of which bears against a washer or clamping plate 24, by means of which the block is held in sliding engagement with the blade when the nut 22, is loosened on the pin 21. In order to tighten the block 18, in its adjusted position, the nut is screwed up against the tension of the spring 23, thus binding the washer 24 against the adjacent side of the blade and securing the block against movement thereon.

Slidably mounted in the short slot 16 of the blade is a holding block or member 25, which is constructed in a similar manner to the gage block 18 and is provided with a vertical edge or surface 26. The block 25 is held in sliding engagement and is locked in position on the blade by means of a spring projected washer and a nut 27, which correspond with and are constructed in the same manner as the nut 22, and similar parts of the block 18.

In using the gage, the drill is placed in the V-shaped seat of the block, and the upper or pointed end of the drill is engaged with the inner edge of the blade 10 which determines the angle of the lips. The gage block or member 25 is now slipped upon the blade and its vertical edge is engaged with the adjacent side of the drill which will hold the latter against rocking. The gage block 18 is now slipped down on the blade until its 59° surface or edge is engaged with the lip of the drill which will indicate whether or not the lip is of the proper length, thus testing the drill point or lips. This arrangement illustrates the manner of using the gage for testing a two lip drill and is clearly shown in Fig. 1 of the drawings. In Fig. 2 of the drawings, the parts are shown as arranged for testing a three lip drill and in this instance the block 25 is adjusted against the drill as described in connection with Fig. 1, while the gage block 18 is slipped down on the blade until its 90° angle surface is in engagement with the upper end of the drill, thus testing the length and angle of the lips.

In Figs. 7 and 8 of the drawings is illustrated another form of gage having a pivoted or universal blade whereby lips of any angle may be tested. The universal gage comprises a stem or shank 28, constructed in the same manner as the stem 7 of the stationary gage. On the upper end of the stem or shank is a plate 29 corresponding to the plate 11, of the other form of gage and adapted to engage the slot 4 in the block. On the upper portion of the plate 29, is pivotally mounted a plate or universal blade 30, said plate being pivoted on a pin or bolt having arranged thereon a clamping nut 31, which when screwed up to tight engagement with the blade will bind the latter and hold the same in its adjusted position. On the inner pivoted end of the blade 30 is formed a segmental head 32, around the edge of which is arranged a scale of degrees which are adapted to co-act with a similar scale of degrees on the plate 29 whereby the position or angle of the blade may be readily determined. By means of this pivotal connection of the blade 30 and the scale of degrees, the blade may be set for testing the lips of any form of drill. The universal blade 30 is provided with an adjustable length gaging block 33 and drill holding block 34, which correspond with the length gaging and holding blocks 18 and 25 shown in the first form of the tool. The blocks 33 and 34 are held in their adjusted positions on the blade 30 by pins 35 and nuts 36 which correspond with and operate in the same manner as the pins and nuts of the blocks 18 and 25. The blocks 33 and 34 are provided with rounded bit engaging surfaces to facilitate their operation at any angle of the blade 30.

In practice the gages will be constructed in right and left forms for testing both right and left hand drills, reamers and the like.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:

1. In a gage of the character set forth, a block having a V-shaped seat and a longitudinal socket, a blade having a shank adapted to engage said socket, means on the block to engage said shank and retain the blade in operative engagement with the block, and a length gage block slidably mounted on said blade and having measuring surfaces formed thereon at an angle to each other and the blade to test the length of the lips of the drill.

2. In a drill testing gage, a block having a V-shaped seat and a longitudinal socket, a blade having a shank adapted to engage the said socket, a spring pressed pin mounted on the block and engaging said shank, a length gage block slidably mounted on said blade and having angular measuring surfaces formed thereon, and means to hold said length gage block in engagement with said blade.

3. In a gage of the character described, a block having a V-shaped seat, a socket and a slot formed therein, an angle gaging blade having a shank adapted to be inserted in said socket and a plate to engage the slot in said block, said shank having a longitudinal groove adapted to form a continuation of the V-shaped seat in said block, and a length gage block slidably mounted on said blade and having formed thereon measuring surfaces for testing the length of the lips of the drill.

4. In a gage of the character described, a block having formed therein a V-shaped drill seat and a longitudinal socket, an angle blade having formed therein longitudinally disposed slots, a shank formed on said blade and adapted to be engaged with the socket in said block, means to hold said shank and blade in operative engagement with the block, a drill holding block and a length gage block slidably mounted in the slots of said blade, said length gage having formed thereon angular length gaging surfaces, means to hold the blocks in yielding slidable engagement with the blade, and means to lock or fasten the blocks in their adjusted position.

5. In a gage of the character described, a block having formed therein a V-shaped drill seat and a socket, an angle gaging blade having formed therein longitudinally disposed slots, a length gage block slidably mounted on said blade, said block having angular lip engaging surfaces formed therein and adapted to be engaged with the lips of the drill to test the length of the latter, a drill holding block slidably mounted in said blade, threaded pins secured to said block and projecting through the slots in said blade, washers arranged on said pins, nuts adapted to be screwed on the outer end of the pins and into engagement with said washers to lock the blocks in their adjusted position and springs arranged in said nuts and adapted to bear against said washers whereby the blocks are yieldingly held in sliding engagement with the blade.

6. In a drill testing gage, a block having a V-shaped seat and a longitudinal socket, a blade having a shank adapted to engage said socket, means to retain said blade in operative engagement with the block, a length gage block slidably mounted on said blade and having measuring surfaces formed thereon at an angle to each other for testing the length of the lips of the drill, and means to hold said length gage block in yielding engagement with said blade and to lock it in adjusted position.

In testimony whereof I have hereunto set my hand in presence of two subscribing witnesses.

ADOLPH H. REIMANN.

Witnesses:
 HERMAN VOSS,
 JOHN HAUSTEW, Jr.

---

Copies of this patent may be obtained for five cents each, by addressing the "Commissioner of Patents, Washington, D. C."